United States Patent
Lathrop

(10) Patent No.: US 8,729,730 B2
(45) Date of Patent: May 20, 2014

(54) AUTOMATIC TRANSFER SWITCH WITH TRANSFER INHIBITOR

(75) Inventor: Todd Matthew Lathrop, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 411 days.

(21) Appl. No.: 12/906,306

(22) Filed: Oct. 18, 2010

(65) Prior Publication Data

US 2012/0090966 A1    Apr. 19, 2012

(51) Int. Cl.
    *H02J 9/00* (2006.01)
(52) U.S. Cl.
    USPC ............... 307/64; 307/80; 307/116; 307/117
(58) Field of Classification Search
    CPC ............ H02J 9/062; H02J 1/10; H03K 17/79; H03K 17/962
    USPC ...................... 307/64, 80, 116, 117
    See application file for complete search history.

(56) References Cited

U.S. PATENT DOCUMENTS

| | | | | |
|---|---|---|---|---|
| 5,646,459 A | * | 7/1997 | Hatate et al. | 307/85 |
| 5,739,594 A | * | 4/1998 | Sheppard et al. | 307/64 |
| 6,285,178 B1 | * | 9/2001 | Ball et al. | 323/351 |
| 2001/0025349 A1 | * | 9/2001 | Sharood et al. | 713/340 |
| 2003/0042794 A1 | * | 3/2003 | Jarrett, Jr. | 307/23 |
| 2004/0076148 A1 | * | 4/2004 | Ferry et al. | 370/389 |
| 2007/0055409 A1 | * | 3/2007 | Rasmussen et al. | 700/286 |
| 2007/0114958 A1 | * | 5/2007 | Serrano et al. | 318/267 |
| 2008/0088182 A1 | * | 4/2008 | Lathrop | 307/64 |
| 2009/0091193 A1 | * | 4/2009 | Page | 307/140 |
| 2009/0121547 A1 | * | 5/2009 | Paik et al. | 307/34 |
| 2009/0150100 A1 | * | 6/2009 | Pifer et al. | 702/62 |
| 2010/0013308 A1 | * | 1/2010 | Lathrop et al. | 307/64 |
| 2010/0141038 A1 | * | 6/2010 | Chapel et al. | 307/64 |

\* cited by examiner

*Primary Examiner* — Jared Fureman
*Assistant Examiner* — Alfonso Perez Borroto
(74) *Attorney, Agent, or Firm* — Eckert Seamans Cherin & Mellott, LLC; Kirk D. Houser

(57) ABSTRACT

Apparatuses and methods for providing a capability to prevent an automatic transfer switch from automatically switching from a primary to a secondary power source are illustrated. The automatic transfer switch includes a transfer inhibitor that is configured to receive a transfer inhibit signal. In response to receiving the transfer inhibit signal, a switching logic is configured to prevent a contactor of the automatic transfer switch from automatically connecting the secondary source to a load.

17 Claims, 3 Drawing Sheets

AUTOMATIC TRANSFER SWITCH WITH TRANSFER INHIBITOR

BACKGROUND

Today more and more residential and commercial sites are employing some type of secondary or backup power source to protect against power outages. When a secondary source is installed, a transfer switch is also typically installed to provide a switchable connection between a primary source and a load or the secondary source and the load. In the event that the primary source is not able to provide power to the load, the transfer switch will switch automatically from the primary source to the secondary source.

SUMMARY

An automatic transfer switch is provided that is configurable to be electrically connected to a primary conductor to carry electric power from a primary source. The automatic transfer switch is electrically connected to a secondary conductor to carry electric power from a secondary source. The automatic transfer switch is also electrically connected to a load.

The automatic transfer switch includes a contactor that selectively electrically connects the load conductor to either the primary conductor or the secondary conductor. The automatic transfer switch further includes a switching logic that controls the contactor to electrically connect the load conductor to either the primary conductor or the secondary conductor.

The automatic transfer switch includes a transfer inhibitor configured to receive a transfer inhibit signal and to cause the switching logic to prevent the contactor from connecting the load conductor to the secondary conductor in response to receiving the transfer inhibit signal. The transfer inhibitor may include a contact closure that latches closed in response to the transfer inhibit signal. The transfer inhibitor may receive the transfer inhibit signal wirelessly.

In response to receiving the transfer inhibitor signal, the transfer inhibitor causes the switching logic to prevent the contactor from connecting the secondary conductor to the load conductor. Alternatively, in response to receiving the transfer inhibitor signal, the transfer inhibitor may cause the switching logic to control the contactor to disconnect the primary conductor from the load conductor without connecting the secondary conductor to the load conductor. Therefore, the transfer inhibitor prevents the secondary source from starting in response to the transfer inhibit signal.

In one embodiment, after receiving the transfer inhibit signal, the transfer inhibitor prevents the switching logic from controlling the contactor to connect the load conductor to the secondary conductor until a reset signal is received.

In one embodiment, the transfer inhibitor is configured to receive the transfer inhibit signal from a home monitoring system. The home monitoring system may be a fire detection system. A sending unit of a home monitoring system may send a transfer inhibit signal that causes the transfer inhibitor to prevent the switching logic from connecting the load conductor to the secondary conductor.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

In some circumstances, it is undesirable for the automatic transfer switch to connect the secondary source to the load. For example, in the case of fire at a residential or commercial site, the firefighters may choose to purposely disconnect power at a primary source. The transfer switch would recognize the interruption in power from the primary source, and would consequently engage the secondary power source to provide power. Therefore, the firefighters would then also have to locate and disconnect the secondary power source to ensure that electrical power is no longer present in the buildings.

Figure 1:
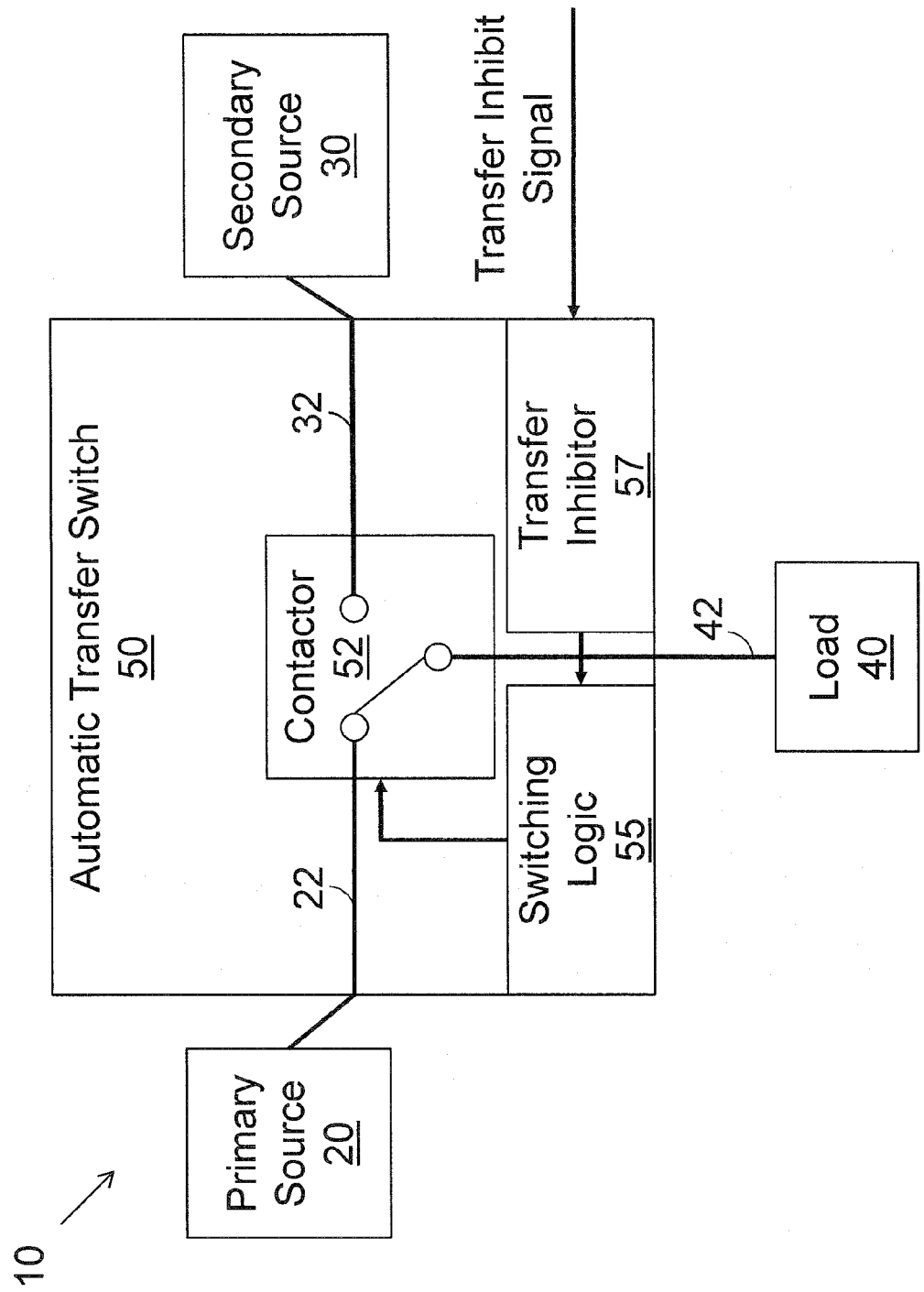
FIG. 1 is a schematic diagram of an example embodiment of an automatic transfer switch with transfer inhibitor.

Referring to FIG. 1, an example embodiment of electric power control system 10 that includes an automatic transfer switch with transfer inhibitor 57 is illustrated. The automatic transfer switch with transfer inhibitor 57 controls power flowing to a load 40 on a load conductor 42 from either a primary source 20 on a primary conductor 22 or a secondary source 30 on a secondary conductor 32. In the event that the primary source 20 is not providing power to the load 40 within a range of acceptable power quality, the automatic transfer switch 50 will connect the secondary source 30 to the load 40.

The automatic transfer switch 50 includes a contactor 52. The contactor 52 selectively electrically connects the load conductor 42 to either the primary conductor 22 or the secondary conductor 32. The contactor 52 may be an electrically controlled switch that electrically connects the load conductor 42 to either the primary conductor 22 or the secondary conductor 32 with a moving contact.

The contactor 52 is controlled by a switching logic 55. The switching logic 55 senses power on the primary conductor 22. When the sensed power is within the range of acceptable quality, the switching logic 55 controls the contactor 52 to electrically connect the primary conductor 22 to the load conductor 42. When the sensed power on the primary conductor 22 is not with the range of acceptable quality, the switching logic 55 control the contactor 52 to electrically connect the secondary conductor 32 to the load conductor 42.

The automatic transfer switch 50 includes a transfer inhibitor 57 that is configured to receive a transfer inhibit signal that indicates that it is not desirable for the load 40 to draw power from the secondary source 30. In response to the transfer inhibit signal, the transfer inhibitor 57 prevents the switching logic 55 from connecting the load 40 to the secondary source 30. The transfer inhibit signal may be received from a wired connection (e.g., closure contact). Alternatively, the transfer inhibit signal may be received wirelessly from a remote system. The transfer inhibit signal may be sent in any circumstance when it is not desirable for the load 40 to draw on the secondary source 30.

In one embodiment, the transfer inhibitor 57 communicates the transfer inhibit signal to the switching logic 55. Accordingly, the transfer inhibitor 57 may cause a relay or contact to open or close to prevent the switching logic 55 from causing the contactor 52 to switch from the primary source 20 to the secondary source 30. Thus, regardless of whether the primary source 20 is within the range of acceptable power quality, in the presence of the transfer inhibit signal, the switching logic 55 will not cause the load 40 to be connected to the secondary source 30.

The switching logic 55 may be configured to disconnect the primary conductor 22 from the load conductor 42 without connecting the secondary conductor 32 to the load conductor 42 in response to the transfer inhibitor 57 receiving a transfer inhibit signal. The switching logic 55 may disconnect the secondary conductor 32 from the load conductor 42 when the transfer inhibitor 57 receives the transfer inhibit signal.

Figure 2:
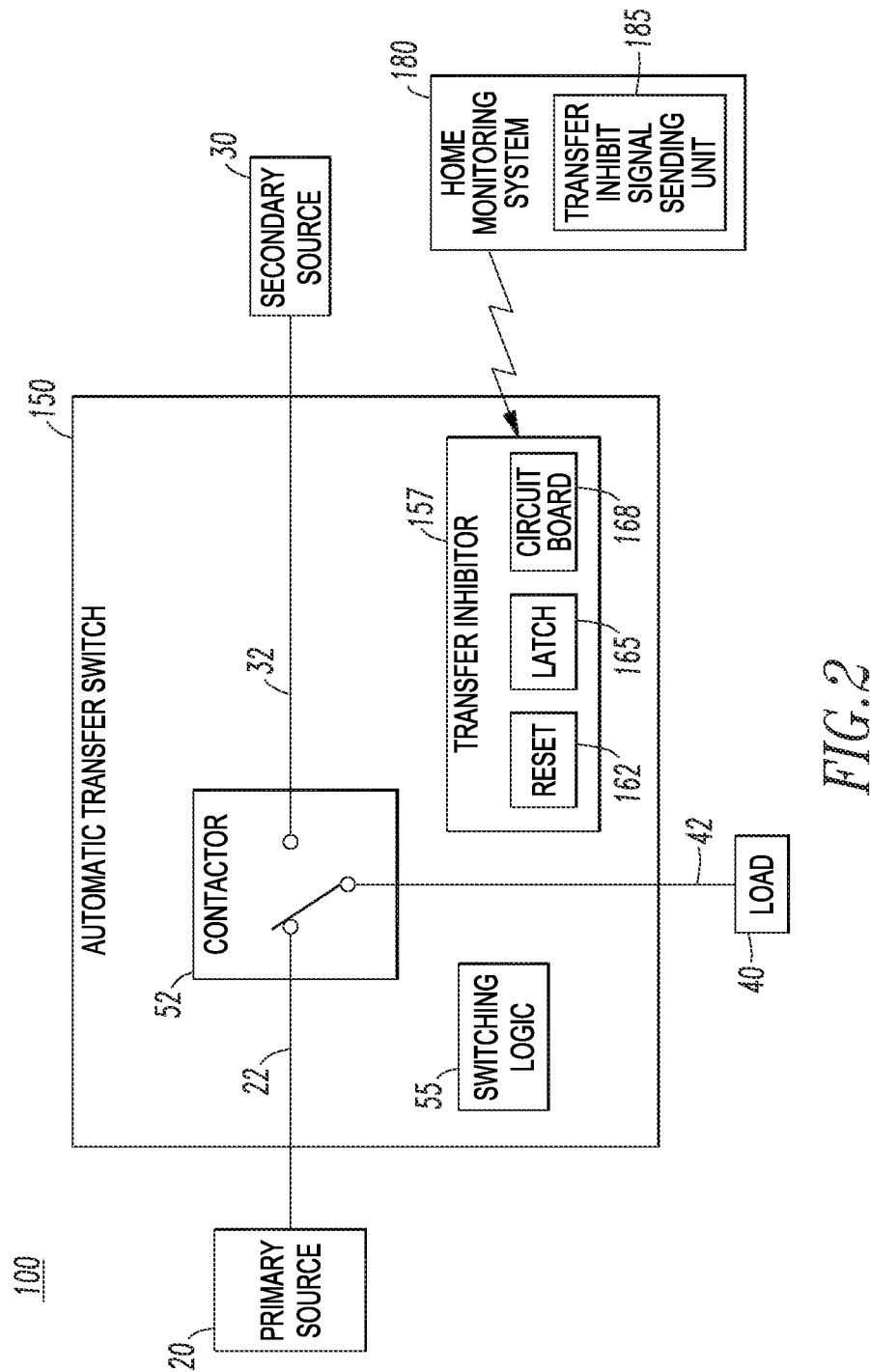
FIG. 2 is a schematic diagram of an example embodiment of an automatic transfer switch with transfer inhibitor.

Referring to FIG. 2, an example embodiment of electric power control system 100 that includes an automatic transfer switch 150 is illustrated. The automatic transfer switch 150 controls the flow of power from a primary source 20 to a load 40 or a secondary source 30 to the load. The primary source 20 may be, for example, a utility. The secondary source 30 may be, for example, a generator. The load 40 may be, for example, a main circuit breaker panel for a residence or building. Power from the primary source 20 flows to the load 40 on a primary conductor 22 through the automatic transfer switch 150. Power from the secondary source 30 flows to the load 40 on a secondary conductor 32 through the automatic transfer switch 150. The automatic transfer switch 150 includes a contactor 52, a switching logic 55, and a transfer inhibitor 157.

The transfer inhibitor 157 is configured to receive a transfer inhibit signal. The transfer inhibit signal may originate from a home monitoring system 180. The home monitoring system 180 may be configured to identify events, for example, a heat sensor detecting a sudden increase in temperature, a smoke detector detecting the presence of smoke, moisture sensors detecting the presence of a disproportionate moisture level, as in the case of flooding, and a window sensor detecting that a window pane has been broken. The home monitoring system may also be a fire detection system.

The home monitoring system 180 may include a transfer inhibit signal sending unit 185. The transfer inhibit signal sending unit 185 may be programmed with a list of events that will result a transfer inhibit signal being sent to the transfer inhibitor 157. For example, the home monitoring system 180 may detect that a disproportionate moisture level event has occurred where moisture levels are too high. However, if the disproportionate moisture level event is not on the list of events, the transfer inhibit signal sending unit 185 will not send the transfer inhibit signal. If the home monitoring system 180 detects a smoke event that is on the list of events, the transfer inhibit signal sending unit 185 will send the transfer inhibit signal.

The transfer inhibit signal sending unit 185 receives notification from the home monitoring system 180 that the event has been identified. In response, the transfer inhibit signal sending unit 185 sends a transfer inhibit signal to the transfer inhibitor 157. In response to receiving the transfer inhibit signal, the transfer inhibitor 157 prevents the contactor 52 from connecting the load conductor 42 to the secondary conductor 32. The home monitoring system 180 may be wired into the automatic transfer switch 150. Alternatively, the home monitoring system 180 may be a remote system that communicates the transfer inhibit signal to the automatic transfer switch 150 wirelessly.

For example, if the home monitoring system 180 identifies a sudden increase in temperature, a fire alarm may be triggered. In responding to the fire alarm, firefighters may cut off power from the primary source 20 to the load 40 by interrupting the primary conductor 22. This may be done to prevent power from reaching the load 40, because receiving power at the load 40 may exacerbate a fire. The transfer inhibitor 157 will prevent the switching logic 55 from causing the contactor 52 to connect the secondary source 30 to the load 40.

The transfer inhibitor 157 may include a reset 162. The reset 162 may be a manual reset (e.g. button, switch) or the reset 162 may be a programmable device capable of receiving instructions remotely. Activating the reset 162 will allow the switching logic 55 to operate normally. Accordingly, in response to the reset 162 being activated, the switching logic 55 allows the contactor 52 to connect the secondary source 30 to the load 40.

The transfer inhibitor 157 may further include a latch 165. The latch 165 closes in response to receiving the transfer inhibit signal. Closing of the latch 165 causes the transfer inhibitor 157 to prevent the switching logic 55 from allowing the contactor 52 to switch from the primary source 20 to the secondary source 30. The transfer inhibitor 157 may also include a circuit board 168. The circuit board 168 includes an input that is connected to the transfer inhibitor 157.

"Logic", as used herein, is a physical component and includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 3:
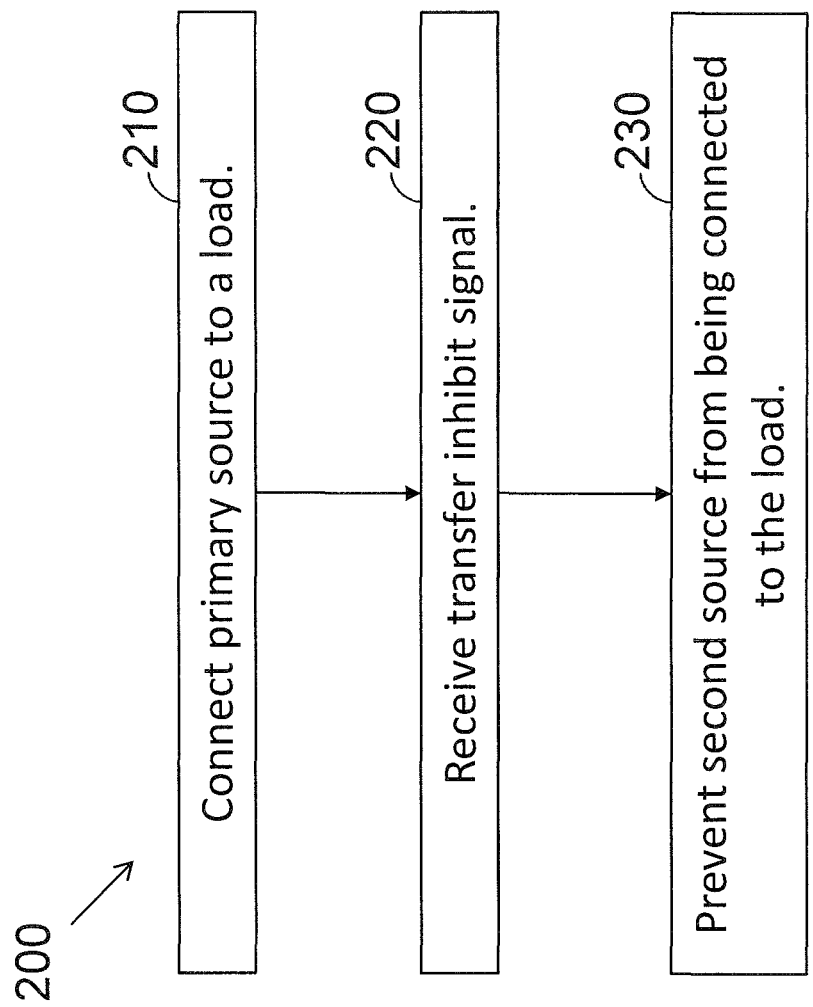
FIG. 3 illustrates an example embodiment of a method for operating an automatic transfer switch that includes a transfer inhibitor.

FIG. 3 illustrates an example embodiment of a method for operating an automatic transfer switch that includes a transfer inhibitor. Method 200 includes, at 210, controlling a contactor to electrically connect a primary source to the load. The contactor may be an electrically controlled switch. Alternatively, the contactor may be a relay.

At 220, a transfer inhibit signal is received. Accordingly, at 230, the switching logic is prevented from causing the contactor to connect a secondary source to the load based at least in part on the transfer inhibit signal.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An automatic transfer switch, the automatic transfer switch configurable to be electrically connected to a primary conductor configured to carry electric power from a primary source, a secondary conductor configured to carry electric power from a secondary source, and a load conductor, the automatic transfer switch comprising:
   a contactor that selectively electrically connects the load conductor to either the primary conductor or the secondary conductor;
   a switching logic within said automatic transfer switch that controls the contactor to electrically connect the load conductor to either the primary conductor or the secondary conductor; and
   a transfer inhibitor within said automatic transfer switch, said transfer inhibitor including a reset device within said transfer inhibitor, said reset device being structured to be activated to allow said switching logic to operate normally in order that said switching logic can allow said contactor to electrically connect the load conductor to the secondary conductor, said transfer inhibitor being configured to receive an external transfer inhibit signal from a wired or wireless communication of a remote system outside of said automatic transfer switch and to prevent, until said reset device is activated, the switching logic within said automatic transfer switch from controlling the contactor to electrically connect the load conductor to the secondary conductor and to maintain an electrical connection from the primary conductor to the load conductor in response to receiving the external transfer inhibit signal.

2. The automatic transfer switch of claim 1, where the transfer inhibitor comprises a contact closure that latches closed in response to the external transfer inhibit signal from outside of said automatic transfer switch.

3. The automatic transfer switch of claim 1, where the transfer inhibitor is configured to receive the external transfer inhibit signal wirelessly from the wireless communication of the remote system.

4. The automatic transfer switch of claim 1, where after receiving the external transfer inhibit signal, the transfer inhibitor prevents the switching logic from controlling the contactor to electrically connect the load conductor to the secondary conductor until said reset device receives a reset signal.

5. The automatic transfer switch of claim 1, where the transfer inhibitor comprises a circuit board that includes at least one input connected to the transfer inhibitor.

6. The automatic transfer switch of claim 1, where the transfer inhibitor is configured to receive the external transfer inhibit signal from a home monitoring system as the remote system.

7. The automatic transfer switch of claim 6, where the home monitoring system is a fire detection system.

8. The automatic transfer switch of claim 6, where the transfer inhibitor prevents the switching logic from connecting the load conductor to the secondary conductor in response to receiving the external transfer inhibit signal from a sending unit of a home monitoring system as the remote system, indicative of one of a plurality of events.

9. A method, comprising:
   controlling within an automatic transfer switch a contactor to electrically connect either a primary source or a secondary source to a load;
   receiving by a transfer inhibitor within said automatic transfer switch an external transfer inhibit signal from a wired or wireless communication of a remote system outside of said automatic transfer switch;
   including a reset device within said transfer inhibitor, the reset device being structured to be activated to allow said controlling to operate normally and to allow the contactor to electrically connect the load to the secondary source; and
   in response to receiving the external transfer inhibit signal, said transfer inhibitor preventing, until said reset device is activated, the contactor from electrically connecting the secondary source to the load and maintaining an electrical connection from the primary source to the load.

10. The method of claim 9, where the preventing is performed until said reset device receives a reset signal.

11. The method of claim 10, comprising said reset device receiving the reset signal as a result of a manual reset of the automatic transfer switch.

12. The method of claim 10, comprising said reset device receiving the reset signal wirelessly.

13. The method of claim 9, comprising receiving the external transfer inhibit signal from a home monitoring system as the remote system.

14. The method of claim 9, where the external transfer inhibit signal is received wirelessly from the wireless communication of the remote system.

15. An automatic transfer switch comprising:
    means within said automatic transfer switch for controlling a contactor to electrically connect either a primary source or a secondary source to a load;
    means within said automatic transfer switch for receiving an external transfer inhibit signal from a wired or wireless communication of a remote system outside of said automatic transfer switch; and
    a transfer inhibitor within said automatic transfer switch, said transfer inhibitor including a reset device within said transfer inhibitor, the reset device being structured to be activated to allow said means within said automatic transfer switch for controlling to operate normally and to allow the contactor to electrically connect the load to the secondary source, said transfer inhibitor preventing, until said reset device is activated, the contactor from electrically connecting the secondary source to the load and maintaining an electrical connection from the primary source to the load in response to receiving the external transfer inhibit signal.

16. The automatic transfer switch of claim 15 where the means for receiving a transfer inhibit signal is configured to receive the external transfer inhibit signal from the remote system that senses environmental conditions.

17. The automatic transfer switch of claim 15, where the transfer inhibitor is configured to function until a reset signal is received by said reset device.

* * * * *